March 6, 1962   J. A. VAN METER   3,024,327
PEDAL OPERATED POWER CONTROL DEVICE
Filed April 24, 1959                 2 Sheets-Sheet 2
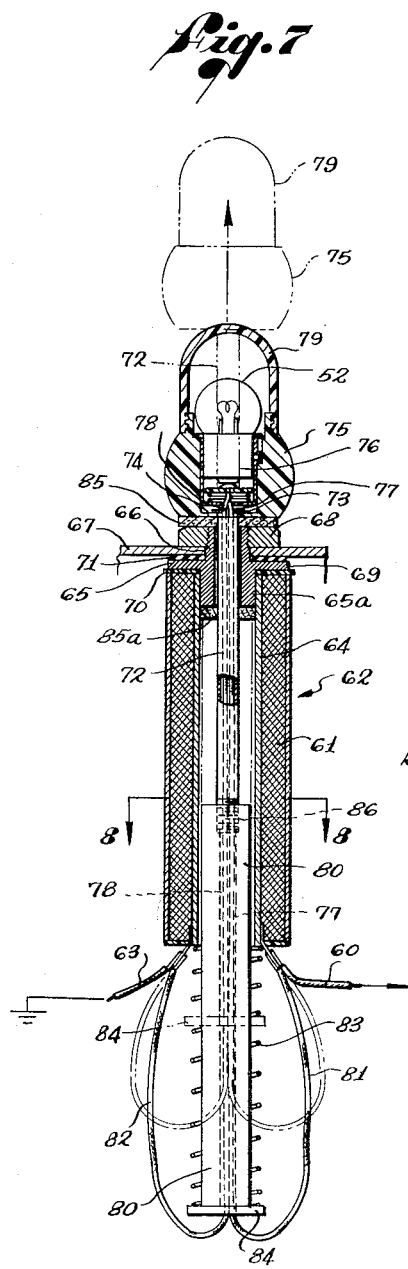
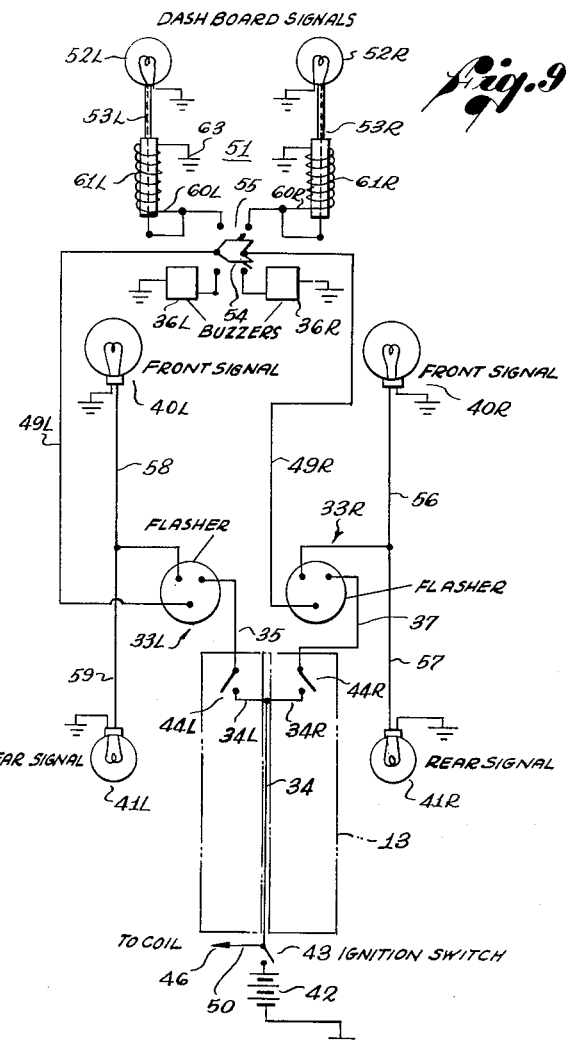
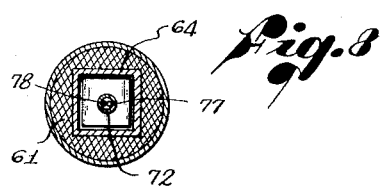
INVENTOR.
JAMES A. VAN METER
BY George R. Bliss
Attorney

# United States Patent Office 3,024,327
Patented Mar. 6, 1962

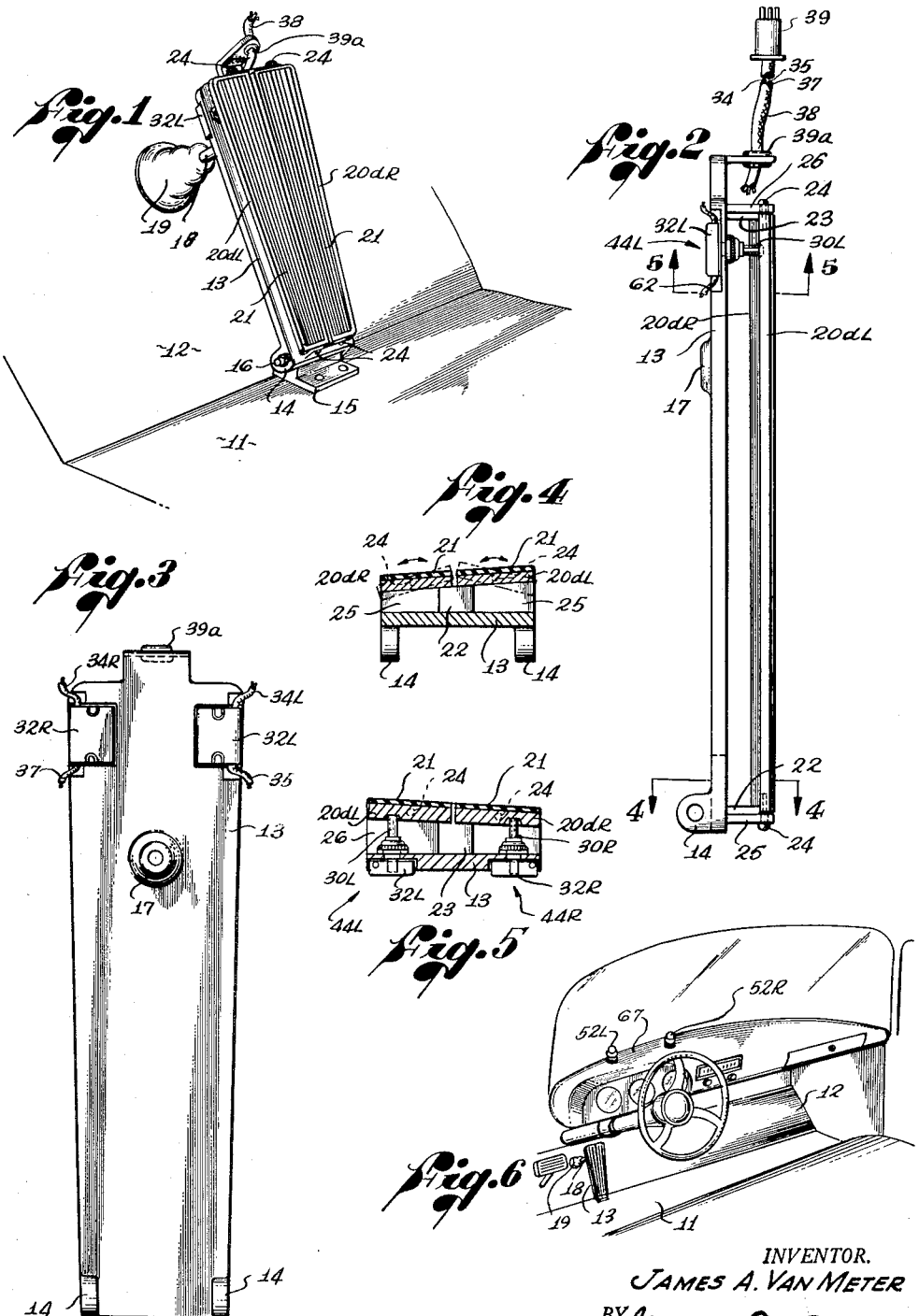

3,024,327
PEDAL OPERATED POWER CONTROL DEVICE
James A. Van Meter, 15357 Magnolia Blvd.,
Van Nuys, Calif.
Filed Apr. 24, 1959, Ser. No. 808,701
5 Claims. (Cl. 200—61.29)

This invention relates to a pedal operated power control device.

This invention was made as part of a project to design an improved automotive vehicle directional signalling equipment. The invention is not limited to such equipment but is applicable wherever a plurality of power using devices is employed, two of which have right and left handed characteristics, respectively, preferably electrically powered, and an additional device, preferably an internal combustion engine, is employed in contemporaneous and cooperative relationship with the two devices with said characteristics. The invention is herein shown and described with a typical example of such equipment.

Conventionally such equipment is constructed in such a manner and is so designed that the vehicle operator in advance of making a turn to the right or left, may manually throw a switch lever mounted on or near the steering post of his vehicle. This switch lever selectively places, either the right front curb and right rear stop lamps, or the left front curb and left rear stop lamps in a closed circuit with the car storage battery through a flasher. When this switch lever is moved upwardly from a normal median neutral position the right hand lamps will be intermittently illuminated. When the switch lever is moved downwardly from this median position the lefthand lamps will be intermittently illuminated. It is mechanically impossible in this conventional equipment to illuminate both right hand and left hand lamps simultaneously.

The switch lever is automatically returned to neutral from either its upper or lower position by a ratchet and pawl mechanism on the steering shaft within the steering post. A pawl of this mechanism, which is mounted to move with the steering shaft, slides over a tooth on a ratchet wheel which is operatively connected to the manual switch lever. This occurs as soon as the vehicle steering wheels and the steering shaft have moved from their initial normal position over a predetermined relatively small arc of travel. When the turn has been completed and the wheels and steering shaft are turning back toward their normal position for straight ahead driving, the pawl engages the ratchet tooth and moves the switch lever back to its median neutral position. A pawl and co-operating tooth on the ratchet wheel are required for each respectively of the right and left turning movements of the vehicle steering equipment.

This return of the switch to its neutral position by which the directional signal is "cancelled," may be also accomplished in most of the directional signalling equipment now in use, by the driver manually shifting it to that position. Another feature of the conventional signalling equipment is the inclusion in each of the right hand and left hand illuminating circuits of a small pilot indicating lamp mounted on the dashboard or other position within the field of vision of the driver, by which he may know whether the front or rear signal lights are in operation and working properly.

These presently known and used signalling devices are a part of the standard equipment of millions of automotive vehicles and have, on the whole, been eminently satisfactory. There are however features of this equipment which have not proven entirely satisfactory over the years as the motor car industry developed. Changes in design of motor vehicles, in their power plants and steering mechanism, changes in the design and character of the highways, the advent of multilane highways and later of freeways, the enormous increase in the number of automotive vehicles on the highways, and the resultant changes in the driving pattern and habits of the motorist account for the lessening suitability of the conventional directional signalling equipment to present day motor car operation and to future motor car operation if present trends continue. The present steady and gratifying decrease in the number of accidents, injuries, fatalities and property damage per vehicle mile, if it is to continue and be augmented, calls for improvement in directional signalling along with improvement in all other automotive vehicle equipment. Such improvement in directional signalling equipment is particularly timely at the present juncture, when many states now require or are planning to require installation at the factory of such equipment as a standard item on automotive vehicles.

As an example of a feature of design of present directional signalling equipment susceptible to improvement, are the indicating pilot lamps within the field of vision of the driver. In the period of time just prior to and during the making of a righthand or lefthand turn, the driver is mentally occupied with observation of cars ahead, cars behind, and cars approaching an intersection or turnoff from either side of him, and with observation of highway traffic signals and of the nature and markings of the highway. Almost all of this observation is visual. Under these conditions, the driver, especially in present day congested traffic, is understandably apt to overlook the indicating pilot lamps of his directional signalling system. This is especially true during daylight hours when the monitoring pilot lamps are apt to go unnoticed because of their low candle power. Such oversight may lead to serious consequences. He may have inadvertently failed to throw the switch lever, or may have thrown it in the wrong direction; one or more of the lamps may have burned out; the automatic cancelling mechanism may have failed to work due to a breakdown therein, or due to the fact that the angle of turn was too small to actuate the cancelling mechanism. The angle of turn in shifting a car from one lane to another, a frequent shift on multilane highways and freeways, is usually insufficient to operate the automatic cancelling pawl and ratchet devices. If, to eliminate this difficulty, the pawl and ratchet are adjusted for a smaller angle of turn, a slight weave of the vehicle after the driver has set the switch lever will cancel the lighting circuits before he begins his right or left turn.

If the driver has not closely watched his pilot lamps he may, in any of the above mentioned or similar contingencies drive the vehicle in an unsafe and/or unlawful manner. The signal may be incorrect. The flashing illumination of one or both front and rear curb and stop lamps may continue for an undue period of time after the turn has been completed.

It is therefore one object of the invention to provide a performance monitoring device of a greater attention-compelling character. In this invention, this result is accomplished by mounting the monitoring pilot lamps directly in the line of vision of the driver as he operates the car, and intermittently moving the lamps in time with their flashing illumination, and is optionally or supplementarily accomplished by an audible monitoring indicator intermittently operable by the flasher means.

To assist in securing against failure of the automatic cancelling means it is another object of the invention to provide a spring biased switch under the control of the driver which shall operate to initiate and continue in operation an illumination of the front and rear signalling lamps by one act of the driver, and which shall be operable by a similar act of the driver as the sole means by which to discontinue such illumination.

Since the hands of the driver are busily occupied with the control of the vehicle as to speed and directional steering just prior to, during, and subsequent to, a turning movement of the vehicle, it is another object of the invention to place the control of the directional signalling means under the control of a foot of the driver and preferably under such control by the provision of suitable connections of the signalling means with the engine fuel intake accelerator pedal. It is also an object to accomplish the objects above stated by means of this foot actuated control of the driving accelerator pedal, upon which rests the foot of the driver during virtually all of the time the car is being operated.

It is another object of the invention to provide a directional signalling equipment with a control means such that the lefthand lamps may be lighted to indicate a lefthand turn, alternatively the righthand lamps may be lighted for a righthand turn, and both left and right hand lamps may be simultaneously lighted at the will of the driver. Such simultaneous illumination of the two sets of lamps may, in the future, be authorized by statute for signalling an intention to park a vehicle for or signalling some other maneuver such as an emergency stop. The lamps of the present conventional directional signalling equipment cannot be thus simultaneously illuminated, except by some special switching arrangement which may be now permissible by law in some jurisdictions. It is still another object to provide a compact and inexpensive device which may be mounted upon the accelerator pedal of a vehicle not equipped for directional signalling or to supplement and and preferably supplant a hand controlled device for the directional signalling equipment which may be an already present accessory.

Other objects will be apparent from a reading of the following description and a perusal of the accompanying drawing which illustrates one embodiment of the invention. The invention is not limited to this embodiment but is to be given the scope and inclusive meaning of the language of the definitions presented in the appended claims.

In the drawings,

FIGURE 1 is a perspective view of an assembly of the control pedals of the directional signalling equipment of this invention mounted in a utility position on a conventional accelerator pedal such as is used to control the fuel intake of an automotive vehicle engine, the pedal being mounted on the floor of the front compartment of an automotive vehicle.

FIGURE 2 is a side elevational view of the control assembly shown in FIGURE 1, the assembly being shown for clarity in a vertical position, instead of the inclined position in which it is shown in FIGURE 1.

FIGURE 3 is a rear elevational view of this same assembly.

FIGURE 4 is a transverse sectional view of the assembly taken along the line 4—4 of FIGURE 2.

FIGURE 5 is a transverse sectional view taken along the line 5—5 of FIGURE 2.

FIGURE 5 is a transverse sectional view taken along the line 5—5 of FIGURE 2.

FIGURE 6 is a perspective view of the interior of the front compartment of the vehicle, showing the pedal control assembly of FIGURE 1 in position on the floor board and the directional indicator monitoring devices in position on the deck of the instrument dashboard behind the windshield and immediately in front of the steering wheel.

FIGURE 7 is a vertical longitudinal sectional view of one of the monitoring devices.

FIGURE 8 is a sectional view taken along the line 8—8 of FIGURE 7.

FIGURE 9 is a wiring diagram of the signalling equipment of the invention, the elements of the equipment being shown in schematic form.

Referring to FIGURE 1, the numeral 11 designates the floorboard of the front compartment of an automotive vehicle; 12 designates the frontboard of this compartment. The pedal is spaced a little above the front board 12. An upwardly dished plate 17 secured to the forward, under face of pedal 13 affords a guiding socket for receiving the upper ball-shaped end of a fuel intake throttle rod 18, which is slidably seated in a housing 19 on the frontboard 12 and spring biased to move away from the floorboard. When the pedal is pressed downwardly by the driver or the rod 18 is moved upwardly by the biasing spring, the conventional connections at the lower end of the rod 18 operate to open and close the fuel throttle valve.

The throttle pedal 13 has mounted upon it a pair of directional signalling pedals 20dR and 20dL. Each is an elongated relatively narrow thin rigid strip of suitable metal or other material. Each is covered upon its upper surface with a strip 21 of non-slip rubber or the like such as is conventionally used on the upper surface of the throttle pedal and which may be omitted from the throttle pedal 13 in a device of this invention. Each is pivotally mounted along a longitudinal axis disposed medianly thereof, on the throttle pedal 13 beneath it, and at a small vertical distance thereabove. The inner edges of the pedals 20dR and 20dL lie closely adjacent each other. This pivotal mounting of the directional signalling pedals is provided in the construction shown in the drawing by means of pivot pins 24 (see FIG. 2), one at each end of each pedal, which are fixedly mounted on upstanding flanges 25 and 26 secured to the upper face of the pedal 13.

The pedals 20dR and 20dL lie normally in a single common transverse plane. This plane is slightly transversely tilted with respect to the plane of the pedal 13 beneath the pedals 20d. The angle of inclination of this common plane is rightwardly and downwardly for a reason to be explained later. This angle of inclination is attained by suitably disposing the pivot pins 24 at each end on center on a transverse line which is inclined relative to the plane of the pedal 13.

The pedals 20d are limited in their rotational movement toward each other by stops 22 and 23 at each end on the inner face of the plates 25 and 26 respectively, which stops may conveniently be the upper end faces of plates secured flat against the inner faces of the flanges 25, 26.

When thus rocked to their extreme inward limit of movement, the pedals 20d lie substantially in a single plane. When either of the pedals 20d is rocked on its longitudinal axis by pressure of the driver's foot in an outward lateral direction of rotation, the upper end of the pedal presses downwardly upon a switch plunger 30R or 30L as the case may be, which is mounted in a switch housing 32R or 32L respectively on the pedal 13. The plungers are spring biased against the driver's foot pressure. The switches 44R and 44L within the housings are of the type which make a direct contact upon a stroke by the driver against the spring pressure followed by an idle spring biased upward return stroke which sets the switch for a contact breaking movement of its mechanism upon a later second downward stroke by the driver against the spring biasing pressure. Such switches are termed push-on, push-off switches. It will be noted that the plungers 30R or 30L are laterally outwardly offset from the hinge pins 24 to permit this outward and downward rocking movement of the pedals.

Two flashers 33L and 33R are mounted under the dash or in some other convenient location. They are shown only diagrammatically on the drawings. (See FIG. 9). These flashers are preferably of the thermo-responsive type. In such a flasher current flows through a resistance element and the coil of an electromagnet to the directional signalling lamps. This current is insufficient to illuminate the lamps. The resistance element is however, heated and upon expansion permits the electromagnet to close a circuit in parallel with the resistance element.

The increased current flow illuminates the lamps. The current through the resistance element is diminished; the element cools and contracts, breaking the connection with the parallel circuit, dimming or extinguishing the illumination of the lamps, again heating the resistance elements, the cycle being thereby repeated continuously as long as the flasher is supplied with current at its intake terminal. Since flashers of this type are in common use, no illustration of its internal structural mechanism is shown other than the diagrammatic showing on FIGURE 9 of the drawing.

Two buzzers 36L and 36R for a purpose to be described later may be similarly mounted at a convenient location about the automobile, preferably one to the left and one to the right of the driver's position, and within readily audible distance of that position. They are of the conventional type and may be adjusted as to volume of sound they emit.

A three conductor cable 38 leads from connections to the switch terminals on the auxiliary pedals (see FIGURES 9 and 2) through a grommeted opening 39a in a bracket at the end of pedal 13 to a male plug 39 which is intended for insertion in a three way socket (not shown) mounted at any suitable location on the vehicle. The terminals of this socket are connected by associated conductors (see FIGURE 9) to the directional signalling lamps and to the car battery in a manner which is in accordance with the principles of this invention.

FIGURE 9 is a wiring diagram of the structure described above and of the elements of the automotive vehicle concerned with the signalling equipment.

40R and 40L are the righthand and lefthand curb lamps respectively. 41R and 41L are the righthand and lefthand rear stop lights respectively. The curb and stop lamps are conventionally used for directional signalling. Other lamps may, of course, be used and wired for this purpose. 42 represents the car battery. 43 is the ignition switch. The arrow 46 is applied to a conductor 50 leading to the ignition devices of the power plant of the vehicle. 44R and 44L represent the switches within the housings 32R and 32L respectively, described above and operated by the switch plungers 30R and 30L respectively. The numerals 33R and 33L and 36R and 36L represent the flashers and buzzers respectively, referred to in the above structural description. Conductor grounds are indicated by the conventional symbols. The conductors are designated by the numerals as shown.

Within the conductor cable 38 are three conductors 34, 35 and 37. As shown on the diagram in FIGURE 9, conductors 34, 35 and 37 of cable 38 after passing through the grommeted bracket opening 39a (see FIG. 4) and on to the structure of the accelerator pedal 13, are connected as follows. Conductor 34 has two branches, one of which 34R is secured to one terminal of the switch 44R (see FIGURES 2 and 9) and the other of which is secured to the corresponding terminal of switch 44L. The other two terminals of these two switches are connected to conductors 35 and 37 respectively. The pedal structure 13 is indicated diagramatically on FIGURE 9 by means of a dash enclosed area 13, the conductors 34, 35 and 37 entering this area within the cable 38 (not shown as a cable on FIGURE 9).

When the ignition switch 43 is closed the ignition system 46 of the vehicle will be energized by the conductor 50. The conductor 34 in multiple with conductor 50 is branched, and leads by conductors 34L and 34R to normally open, spring-biased switches 44L and 44R respectively.

When switch 44R is closed current will flow through it to conductor 37 and flasher 33R and thence by conductors 56 and 57 to lamps 40R and 41R respectively to ground. Other car drivers will be alerted to a coming righthand turn by the vehicle. Current will also flow through switch 44R and flasher 33R and a conductor 49R to signal monitoring pilot devices grouped on the drawing and designated as an assembly by the numeral 51. These devices comprise a pair of incandescent pilot electric lamps 52R and 52L, vertically movable holders 53R and 53L for the lamps respectively, and buzzers 36R and 36L and the connecting conductors as shown and numbered on the drawing. As will appear from the following description, the invention is workable with either the monitoring lamps alone, the monitoring buzzers alone, or with both lamps and buzzers.

When now switch 44L is closed current will flow through it to conductor 35, flasher 33L and thence by conductors 58 and 59 to lamps 40L and 41L respectively and to ground. Other car drivers will then be alerted to a coming lefthand turn by the vehicle. Current will also flow through switch 44L and flasher 33L and a conductor 49L to the signal monitoring pilot devices assembly 51. By means of a gang switch 54 mounted conveniently on the instrument dash the buzzers may be cut in or out of the monitoring circuit at the option of the driver. By means of another gang switch 55 the vertically movable lamps 52L and 52R may be similarly cut in or out of the monitoring circuit at the option of the driver. There may be occasions when the driver wishes to be notified of the operation of the signalling lamps by the pilot lamps only and other occasions when he wishes to be notified by the buzzers only. And of course, the equipment may be initially constructed with either monitoring lamps only, monitoring buzzers only or both.

One of the monitoring signal lamps and its lamp mount is shown in detail in FIGURE 7. The construction of the two monitoring signal lamps 52L and 52R is identical. Using the numerals applied to the signalling and monitoring lamp equipment without the L or R suffix, upon each closing of the contacts in the flasher 33 during the time period in which switch 44 is closed by the downward movement of pedal 20d, current flows from conductor 49 through switch 55 and conductor 60 to the energizing coil 61 of an electromagnet 62, and thence to ground over conductor 63. The upper open end of a hollow cylindrical housing 64 of this electromagnet coil 61 is fitted with and fixedly secured to, an adapter plug 65 which is inserted in an aperture 66 on the dash deck 67. The cylindrical upper end of the plug 65 is threaded and screw fastened in a ring nut 68. By this means the housing 64 is firmly secured in place under the deck 67.

The interior chamber of housing 64 of the coil 61 is of square cross section as seen in FIGURE 8. The lower end portion of the adapter fastening plug 65 is square in section at 65a where the plug fits within and is fixedly secured in any suitable manner to the upper end of the housing 64. The plug is shaped with a circular flange 69 which rests upon the top plate 70 of the housing and may be provided with a spacing ring 71 between its upper surface and the dash deck 67.

The adapter plug 65 has a central bore in which is disposed for vertical sliding movement a hollow bored non-magnetic rod 72 fitted at its upper end with a centrally apertured plate 73. This plate rests upon a similarly apertured bottom circular wall 74 of a centrally bored lamp base 75. This lamp base encloses a lamp socket 76 into which is screw threaded in conventional manner an incandescent lamp 52 which makes contact with the upper terminals of two conductor wires 77 and 78, the wires being disposed within the bore of the rod 72. A protector, transparent or translucent, cap 79 is threadedly secured to the upper open end of the lamp base 75.

The lower end of the rod 72 is externally threaded at 86 and screwed into the upper end of the bore of a hollow plunger 80 which is of a magnetic material and acts as an armature for the electromagnet 62, being drawn upwardly until it reaches the position shown in phantom dash lines in FIGURE 7, each time the coil 61 is energized by the action of the associated flasher 33 after the associated switch 44 is closed. The plunger drops back to its initial position shown in full lines in FIGURE 7 each time the coil is de-energized by the action of the flasher.

The lower ends of the conductor wires 77 and 78 which lead from the lamp filament at their upper ends down to the open end of the plunger, are connected to the conductors 60 and 63 respectively by loop conductor sections 81 and 82 respectively. The lamp is thus continuously connected with the current supply wires 60 and 63 during the vertical movement of the signal monitoring lamp. The lamp, rod 72 and plunger 80 move as one assembly between the full line position and the phantom line position shown in FIGURE 7, the downward movement being effected by a coil spring 83 surrounding the plunger which is contained between the lower end of the housing 64 and the upper face of a terminal plate 84 secured to the lower end of the plunger. A felt washer 85 on the upper surface of the ring nut 68 absorbs the shock of the return drop of the lamp assembly upon the adapter 68 and the dash deck 67.

To consider now the operation of the invention, if the driver's foot is inclined to the right, switch 44R is closed without appreciably changing the downward pressure of the foot as a whole on the pedal structure. Lamps 40R, 41R, 52R and buzzer 36R are then operated. When his foot is returned to normal position and with it the pedal 20dR returns to normal position, the lamps and buzzer continue to operate. The illumination and vertical movement of lamp 52R and the sound of buzzer 36R indicate to the driver the performance of the signalling equipment. He is free to use his eyes to guide his intellect in operating his vehicle. And since the current switches to the lamps are not operated by his hand, he is free to use his hands for steering or any other control operation of the vehicle. The pedals which operate the directional signals constitute, when either is signalling or in their normal position, a fuel intake throttle control means, since downward pressure on either or both of them operates the accelerator control rod 18. Foot operation of the signalling equipment therefore does not interfere with foot operation of the fuel intake valve.

It will be understood that the construction of the throttle and signalling pedals may be approximately varied according to whether the pedal structure is to be installed on a vehicle already equipped with an accelerator pedal such as has been herein described, or whether signalling equipment of this invention is to be installed at the factory as standard equipment.

The feature of a monitoring buzzer or buzzers which is one of the characteristics of this invention may be used with the conventional pilot indicator lamps as provided in present directional signalling equipment, or may be the only monitoring means. Also it is obvious that two buzzers or other sound emitting means of different tone qualities may be used instead of two buzzers differentially located with respect to the driver. If differential location is relied upon, one should be installed on one side of the driver's position and the other on the opposite side, at a sufficient distance from each other to unmistakably indicate to the driver which of the two signalling circuits is in operation.

The right foot is conventionally used to operate the throttle pedal, which is disposed in a position of convenience and ease for such operation by the right foot. In applying foot pressure to the pedals 20dR and 20dL, which are mounted on the throttle pedal structure in the directional signalling equipment of this invention, the right foot is inclined laterally to the right against the rightward side portion of pedal 20dR to signal a righthand turn, and laterally to the left against the leftward side portion of pedal 20dL to signal a lefthand turn. The physiological structure of the bones and muscles of the right foot, ankle, leg and hip is such that there is a natural normal tendency to an inclination of the foot to the right as it rests upon the throttle pedal structure; and it is with some difficulty that the right foot is inclined at an angle to the left.

To compensate for this, the pedals 20dR and 20dL are so mounted on the accelerator pedal structure that the plane which is common to both pedals when in their normal position, is slightly inclined downwardly and to the right. This feature of construction of the mount for the direction signalling pedals makes it possible to operate either signalling switch to the on or off position by a slight roll of the foot, either to the right or to the left as the case may be, the roll in either direction being of equal angularity from the normal common plane of the two pedals and requiring the application of substantially equal muscular effort.

The position of the right foot is naturally and normally partly upon one signalling pedal and partly on the other signalling pedal, which is the normal position for pushing downwardly upon the accelerator pedal for controlling the delivery of power to the vehicle. Neither of the signalling pedals will operate the signalling equipment until the foot is definitely and substantially inclined in one direction or the other. To make a right turn signal the foot is inclined definitely to the right and quickly brought back to normal position. The right turn signal lamp is illuminated and stays illuminated. The throttle action is not affected. At the completion of the turn the foot must be again inclined to the right to turn off the right turn signal lamp. To signal a lefthand turn, the foot is inclined to the left and then back to normal position and again inclined to the left at the completion of the turn. The prominent vertical up and down movement of the monitoring lamp and/or the sound of the monitoring buzzer will insure the driver making the second inclination of his foot, no matter how much his attention is being given to control of the car with the throttle, brake, and steering wheel. If he wishes to operate both signalling lamps he first inclines his foot in one direction, returns it to normal and then inclines it in the other direction and returns it to normal. To turn off both signalling lights, he simply repeats this routine. Such operation simultaneously of both signalling lamps might be legalized now or later in any given jurisdiction for indicating some intention of the driver with respect to the operation of his vehicle, other than right or left turns, such as an emergency stop, or the like.

Some of the flashers now available for use on directional signalling equipment are designed to transmit current of sufficiently decreased voltage to the monitoring lamp that it will not be lighted in the event that one only of the pair of directional signalling lamps fails to operate. Such a flasher may be used in combination with my invention to obvious advantage.

While the monitoring devices have been herein shown and described as having rods vertically movable upwardly from a normal position and downwardly in return to the normal position, it will be understood that the movable members may be of any suitable shape and size and may be caused to move vertically, laterally, rotatively or in any other manner which will attract the attention of the driver.

I claim:

1. A pedal operated power control device comprising, in combination: a longitudinally elongated pedal structure; a mount for said pedal structure, said mount having a base portion which is provided with suitable means for securement of said base portion to any relatively stationary body provided with cooperating securement means, the pedal structure being pivotally disposed on said mount on a horizontal axis which is transverse of the mount and of the pedal structure, the pedal structure including a body frame and a pair of relatively movable auxiliary pedals, each said auxiliary pedal being pivotally mounted on said pedal body frame on an axis substantially parallel to the pivotal axis of the other auxiliary pedal and extending longitudinally of the pedal structure, each said auxiliary pedal being capable of a limited rocking movement on its said axis between a first position on which its tread surface lies in a plane coincident with the general plane of said body frame of said pedal structure and a second position in which its tread surface lies in a plane of substantial inclination with respect to said first position, the two auxiliary pedals when both are in the first position occupying rightward and leftward positions respectively on a common plane on said pedal structure, each with its inner edge approximately coincident with the longitudinal center line of the pedal structure when in its said first position and its pivotal axis being medianly disposed between its longitudinally extending edges, and each being inclined downwardly and outwardly to the right and left respectively in its second position; electrical contact switch means on said pedal structure in effective contact making laterally outward position of each of the rightward and leftward auxiliary pedals of a construction suitable for making and breaking associated electrical power control circuits; the electric contact means of each switch means comprising a first switch contact element disposed on the laterally outward portion of an auxiliary pedal and a second switch contact element mounted on the pedal structure in position for making and breaking contact with the said first contact element in correlation with the rocking movement of said auxiliary pedal between its said positions, each of said switches being a double thrust spring-retracted switch constructed to make contact on a first thrust against the spring action and break contact on the next following thrust against the spring action; and mechanism on said body frame of said pedal structure constituting the terminal portion at the pedal structure of a motion transmitting train of elements.

2. A pedal operated power control device comprising: a pedal structure having a longitudinal elongated body frame adapted to be connected to a motion transmitting train of elements as a terminal portion thereof and a pivotal mount adapted to pivotally secure said body frame to a stationary base and the like; a pair of auxiliary pedals, each movable mounted on said body frame in spaced relationship thereto for pivotal movement relative thereto on a longitudinal axis substantially parallel to the longitudinal pivotal axis of the other of the auxiliary pedals and to said body frame, each said auxiliary pedal being pivotable on its said axis into a normal first position in which its tread surface lies in a plane in elevated relationship to the general plane of said body frame of said pedal structure and into a second position in which its tread surface lies in a plane of substantial inclination relative to said first position, said two auxiliary pedals, when both are in said first position, occupying rightward and leftward positions respectively on a common plane, each with its inner longitudinal edge adjacent to the inner longitudinal edge of the other and substantially coincident with the longitudinal center line of said body frame when in its first position and each being inclined downwardly and outwardly to the right and left, respectively, in its second position, and its pivotal axis being substantially medianly disposed between its longitudinally extending edges; and electrical contact switch means on said pedal structure in effective contact making inclined position of each of said rightward and leftward auxiliary pedals of a construction suitable for making and breaking associated electrical power control circuits.

3. The combination as defined in claim 2 wherein the electrical contact means of each of said switch means comprises a first contact element disposed on the laterally outward portion of an auxiliary pedal and a second switch contact element mounted on said pedal structure in position for making and breaking contact with said first contact element in correlation with the rocking movement of said auxiliary pedal between its said two positions.

4. The combination as defined in claim 3, wherein each of said switches has a double thrust spring-retracted switch constructed to make contact on an initial thrust against the spring action, and break contact on an ensuing thrust against the spring action.

5. The combination defined in claim 2, in which said common plane of said two pedal treads when in their normal first position is at a small angle of inclination outwardly and downwardly to the right.

References Cited in the file of this patent
UNITED STATES PATENTS

| | | |
|---|---|---|
| 1,154,462 | Walz | Sept. 21, 1915 |
| 1,911,295 | Wagner | May 30, 1933 |
| 2,032,841 | Gerhart | Mar. 3, 1936 |
| 2,195,776 | Geisheimer | Apr. 2, 1940 |
| 2,562,274 | Hollins | July 31, 1951 |